United States Patent Office 2,857,438
Patented Oct. 21, 1958

2,857,438

HYDROCARBON CHLORINATION WITH A LIQUID COOLANT

Robert P. Obrecht, Concord, and Harry Bender, Torrance, Calif., assignors to Stauffer Chemical Company, a corporation of Delaware No Drawing. Application January 22, 1957
Serial No. 635,125

7 Claims. (Cl. 260—654)

This invention relates to an improved process for the chlorination of aliphatic hydrocarbons, olefinic hydrocarbons, or partially chlorinated aliphatic hydrocarbons to produce perchlorinated products such as carbon tetrachloride and tetrachloroethylene in good yield.

The substitution chlorination of such hydrocarbons or partially chlorinated hydrocarbons to provide perchlorinated products such as carbon tetrachloride and perchloroethylene is accompanied by the evolution of a considerable exothermic heat of reaction, and control of the reaction temperature has always been a problem inherent in such chlorination processes. We have found that if the maximum reaction temperature is controlled and held within a relatively narrow range, the production of undesirable fully chlorinated by-products such as hexachlorobenzene, hexachlorobutadiene, as well as the undesirable partially chlorinated by-products, trichloroethylene, chloroform, and other partially chlorinated hydrocarbons, is at a minimum. The optimum maximum reaction temperature, when one desires to produce carbon tetrachloride and/or perchloroethylene, is between about 450° C. to 800° C., and preferably from about 475° C. to 700° C., providing the minimum temperature is held within a narrow range in relation to the maximum temperature, e. g., 10° to 100° C.

To control the maximum reaction temperature, it has been proposed to utilize a coolant in vapor form, frequently one relatively inert to the reactants and to the products of reaction such as steam, nitrogen, argon, and the like. It has also been proposed to use one or more of the products of reaction, these being in vapor phase or vaporized and recycled as a vapor. It will be obvious that the value of the vapor coolant lies in its providing a material which has heat capacity to the extent of its entering temperature as compared to the temperature at which the coolant leaves the reactor along with the products of reaction.

We have found that in place of introducing a coolant in the vapor state, one can desirably introduce the coolant in the liquid state and thus take advantage of its sensible heat as liquid, its latent heat of vaporization, as well as its sensible heat as vapor; this results in a very considerable economy in the overall operation. For example, not only is the cooling water or refrigeration requirement of a plant utilizing a liquid coolant substantially less than one utilizing a vapor coolant, but the reaction capacity is greater since less coolant is required and reactor and recovery system equipment costs are substantially reduced. It is, of course, possible to use a mixed coolant, that is, one which is part vapor and part liquid; to the extent that the coolant is liquid, the advantage of the liquid coolant will be secured. It will be obvious also that it will be possible to increase the production capacity of those existing plants originally designed for use of a vapor coolant by a simple and inexpensive change, one enabling the reactor to handle an appreciable quantity of liquid coolant. The most important chemical advantage, however, in the use of a liquid coolant lies in its favorable effect on the yield of undesirable fully chlorinated by-products such as hexachlorobutadiene and hexachlorobenzene, and the partially chlorinated by-products, trichloroethylene, chloroform, and the like. When a liquid coolant is employed, the yield of these undesirable by-products is substantially reduced to a minimum as compared to the yield of these by-products under otherwise similar conditions but with a vapor coolant.

This improvement we explain and attribute to the following:

In the perchlorination reaction of a constant quantity of hydrocarbon or partially-chlorinated hydrocarbon, it is obvious that a constant quantity of hydrogen chloride is produced. Therefore, under the conditions of constant excess chlorine, it is further obvious that in the case of liquid coolant usage, a lower ratio of the total quantity of chlorinated hydrocarbons to the quantity of excess chlorine in the reactor exit gases is attained than is possible with the use of a vapor coolant.

We have found that it is possible, at a given throughput rate and with a fixed reactor volume, to operate at a lower maximum reaction temperature by using liquid coolant since we have found that the suppression of partially chlorinated hydrocarbon impurities is enhanced by decreasing the ratio of chlorinated hydrocarbons to excess chlorine present in the reactor, and by the increase in reactor retention time gained by use of a liquid vs. vapor coolant.

The composition of the liquid coolant

The liquid coolant is preferably one or more of the products formed in the process or separately derived as from another process. The liquid coolant can at least in part be one or more of the reactants, e. g., chlorine, a hydrocarbon or a partially chlorinated hydrocarbon, fed in liquid form; combinations of various liquid process streams can be used, e. g., the hydrocarbon feed, make-up chlorine and coolant can be fed as liquids while the unreacted chlorine can be recycled as a vapor, or the hydrocarbon feed and a portion of the crude reaction product can be fed as liquids and the chlorine and a portion of the crude reaction product can be fed as vapors, or the hydrocarbon and chlorine can be fed as vapors and a sufficient portion of the crude reaction product can be fed entirely as liquid, or largely as a liquid, the balance as a vapor, to take up the heat of reaction and maintain the maximum reaction temperature at a desired value. In any case, however, it is desirable that the major portion of the cooling should be provided by the use of liquid coolants. The concurrent use of either a liquid chlorine feed or a liquid hydrocarbon feed, or of both, is of advantage in that it enables the total quantity of liquid chlorinated hydrocarbon coolant to be reduced, thus lowering the chlorinated hydrocarbon to chlorine ratio in the reactor; a low value for this ratio is desirable, we have found, since it ensures that the production of heavy ends, e. g., hexachlorobutadiene and hexachlorobenzene, is at a minimum. When a substantial portion of the cooling is effected with a liquid, the temperatures in the reaction zone can easily be held within a narrow range in relation to the maximum temperature in the reaction zone, e. g., 10° to 100° C., and the optimum reaction temperature can be achieved to the end that formation of the aforementioned undesirable heavy ends and of chloroform and trichloroethylene is reduced substantially as compared to the results attained by present known processes.

The useful hydrocarbons

The invention is applicable to the chlorination of saturated aliphatic hydrocarbons and/or unsaturated aliphatic hydrocarbons having a single double bond and/or partially chlorinated saturated aliphatic hydrocarbons having from one to three carbon atoms, such as methane, ethane, propane, ethylene, propylene, methyl chloride, methylene chloride, chloroform, ethyl chloride, dichloro-ethanes, trichloroethanes, tetrachloro-ethanes, pentachloro-ethanes, hexachloro-ethane, monochloro-propanes, dichloropropanes, trichloro-propanes, tetrachloro-propanes, pentachloro-propanes, hexachloro-propanes, and heptachloro-propanes, and mixtures thereof. For convenience, these materials, individually or in admixture with one or more of such materials, are sometimes referred to as the hydrocarbon feed.

The utility of $C_3$ hydrocarbons

The invention is particularly applicable to the substitution chlorination of the $C_3$ hydrocarbons; for example, the substitution chlorination of propane, propylene or propylene dichloride with an excess of chlorine at 450°–800° C., as represented by the equations:

(1) $\quad C_3H_6 + 7Cl_2 \rightarrow CCl_4 + C_2Cl_4 + 6HCl$
(2) $\quad C_3H_8 + 8Cl_2 \rightarrow CCl_4 + C_2Cl_4 + 8HCl$
(3) $\quad C_3H_6Cl_2 + 6Cl_2 \rightarrow CCl_4 + C_2Cl_4 + 6HCl$ to provide carbon tetrachloride and tetrachloroethylene, is well known. Each of these reactions is accompanied by the evolution of considerable heat and it is desirable to control the maximum temperature and to hold the temperatures in the reaction zone within a relatively narrow range in relation to the maximum temperature to the end that the production of carbon tetrachloride and/or perchloroethylene is at the desired maximum while the production of undesirable fully chlorinated by-products, such as hexachlorobenzene and hexachlorobutadiene, and of partially chlorinated hydrocarbons such as trichloroethylene and chloroform is held to a minimum.

The use of a liquid coolant with $C_3$ hydrocarbons is of particular value because it has been said by one investigator with respect to the perchlorination of propylene, propylene dichloride and propane, using a vapor coolant, that the yield of tetrachloroethylene, based on the carbon content of the compound subjected to chlorination, was undesirably low because of the by-products, hexachlorobenzene, hexachlorobutadiene and hexachloroethane, are formed in large amount. Also, separation of the tetrachloroethylene was said to be troublesome because of the considerable amount of hexachlorobenzene present in the mixture of organic products. It was also said that during fractional distillation of the products, hexachlorobenzene tends to separate in solid form and accumulate in the distilling system, thereby reducing the efficiency of the distillation and frequently causing plugging of the vapor-cooling units; periodic shut-downs were therefore necessary to permit the solid deposits of hexachlorobenzene to be removed. These difficulties are most conveniently and economically minimized, if not largely obviated, when a liquid coolant is employed.

The reform reaction

Under certain conditions, the yield of carbon tetrachloride and perchloroethylene will be different from that to be expected from the basic reaction. For example, in the case of propane, propylene and propylene dichloride, the yield of carbon tetrachloride and perchloroethylene may be different from that of the appropriate Reaction 1, 2 or 3; this is because the basic hydrocarbon chlorination Reactions 1, 2 and 3 spontaneously furnish the reaction mass with the heat necessary to attainment of the desired reaction temperature level for the secondary equilibrium:

(4) $\quad 2CCl_4 \rightleftharpoons C_2Cl_4 + 2Cl_2$

This reversible reaction is well-known, having been separately employed for the manufacture of carbon tetrachloride from perchloroethylene (Patent 2,305,821) and for the manufacture of perchloroethylene from carbon tetrachloride (Patent 1,930,350). The equilibrium constant for this reversible Reaction 4 can be determined from the equation:

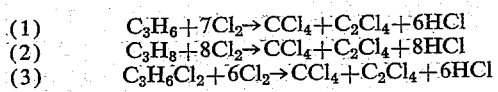

$$K = \frac{(C_2Cl_4)(Cl_2)^2}{(CCl_4)^2}$$

K has a value of $2.47 \times 10^{-3}$ at 490° C. and a value of $2.17 \times 10^{-2}$ at 535° C. Those skilled in the art can readily obtain the value of K for any other temperature for this reversible reaction.

We have found that by varying the chlorine concentration and/or the maximum temperature in the reactor, it is possible, as we will demonstrate with certain of the examples illustrating practice of the invention, to carry out Reaction 1, 2 or 3 along with Reaction 4 under such conditions as to yield a ratio of net product carbon tetrachloride to net product perchloroethylene that is equivalent to the ratio of carbon tetrachloride to perchloroethylene present in the liquid and/or vapor coolants. It is a primary teaching of the prior art that the yield of tetrachloroethylene from propane or propylene could be improved by introducing carbon tetrachloride in the feed mixture. It has also been stated that by introducing tetrachloroethylene instead of carbon tetrachloride, together with the chlorine, propane or propylene, the normal formation of tetrachloroethylene could be suppressed and the yield of carbon tetrachloride increased over that which is obtained without the introduction of tetrachloroethylene in the feed mixture. Since both of the carbon chlorides just mentioned, i. e., carbon tetrachloride and tetrachloroethylene, are normal products of perchlorination reaction of the hydrocarbon feed, it has also been said that it is sufficient, for the production of tetrachloroethylene as a principal product, that a high concentration of carbon tetrachloride be recycled in the process; or, for the production of carbon tetrachloride as a principal product, that a high concentration of tetrachloroethylene be recycled.

We, however, have found that the chlorine concentration and/or maximum temperature can be varied to alter the yield of products over a wide ratio of carbon tetrachloride to perchloroethylene. Thus, we are able to use conditions which are absent from the prior art and which enable the overall yield of carbon tetrachloride or perchloroethylene to be increased preferentially because one material is reformed to provide the other in accordance with the state of equilibrium of Reaction 4; these conditions can be summarized as those in which the chlorine concentration and/or maximum temperature are properly chosen and the period of retention is sufficient to permit Reaction 4 substantially to attain equilibrium. In these instances, the overall reaction represents a combination of the applicable one of Reaction 1, 2 or 3, along with Reaction 4 which latter is dependent on time, the maximum temperature as well as the variables, chlorine, carbon tetrachloride, perchloroethylene concentrations, and total inerts principally hydrogen chloride. Also, in these instances, the applicable one of Reaction 1, 2 or 3 supplies the heat necessary to supply the proper overall maximum reactor temperature level for Reactions 1 and 4, or 2 and 4 or 3 and 4.

As will be demonstrated in Examples 7, 8 and 9, we are also able to operate the reactor under such conditions of temperature (maximum reaction zone temperature and temperature range), excess chlorine, and sufficient time, that the fully chlorinated hydrocarbon coolant entering the reactor, whether in the liquid or vapor state, has no effect on the composition of the products; that is to say, the ratio of total carbon tetrachloride to total perchloroethylene is essentially the same in the coolant as well as in the overall reactor exit gas stream.

Formation of the reaction mixture

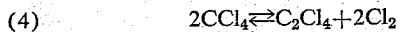

The ratio of chlorine to hydrocarbon and/or partially chlorinated hydrocarbon feed is adjusted to give the desired product composition while the quantity of coolant liquid feed and coolant vapor feed (if any of the latter is employed) is adjusted to control the maximum temperature of the reaction. Unreacted or excess chlorine, that is to say, chlorine not chemically combined can be employed in these perchlorination reactions in the amount of 3% to 60% by volume, measured as unreacted chlorine in the reactor effluent gas. The hydrocarbon feed, chlorine and any recycle components should be introduced into the reactor in such manner that any reaction between the hydrocarbon feed and chlorine prior to release into the reactor is held to a minimum, if, in fact, it is not totally absent so that, in effect, the mixture first attains the temperature of its reaction within the reactor. Any sequence of mixing and any manner of mixing consistent with this limitation can be employed. In the case of the recycle of crude reaction products as a liquid coolant, we prefer to mix the liquid stream with the chlorine stream and thereafter introduce the hydrocarbon stream, the mixing of the three to provide a substantially homogeneous liquid-vapor mixture being effected in such manner that the exothermic reaction of hydrocarbon with chlorine occurs substantially only in the reaction zone in the reactor.

The ratio of products

By varying the maximum temperature and the excess chlorine concentration, we can vary the ratio between the products carbon tetrachloride and perchloroethylene. Thus, the ratio of products can be the same ratio as that of the same components in the coolant; the ratio of products can be that in the coolant and as required by the basic reaction, e. g., in the case of propane, propylene, and propylene dichloride, the ratio can be 1 to 1; to the extent that preferential reformation of one product goes on, the ratio of the products can be different from that of the same components in the coolant, e. g., with propane, propylene and propylene dichloride, the over-all product yield is, in this case, a summation of the appropriate one of Reaction 1, 2 or 3 and Reaction 4. With propane, propylene or propylene dichloride, we prefer a temperature of from about 475° C. to about 700° C.; the excess chlorine should be of the order of from about 3% to about 60%.

The excess of chlorine

The excess chlorine maintained is preferably measured in the gases issuing from the reactor, the quantity of excess chlorine being adjusted by varying the ratio of chlorine to hydrocarbon in the feed to the reactor. When a partially chlorinated $C_3$ hydrocarbon, such as 1-2 dichloropropane, provides all or part of the hydrocarbon feed, the combined chlorine present in such partially chlorinated feed component then must be taken into account as to its equivalence in chlorine content. What is desired is a certain free chlorine concentration in the reactor. For example, with a reactor of a given size, more chlorine and $C_3$ hydrocarbon can be fed and reacted with an all-liquid coolant than with an all-vapor coolant because of the increase in retention time made possible by the use of the liquid coolant.

The time period of reaction

The period of residence in the reactor must be sufficient to permit complete substitution reaction of the hydrocarbon. When a secondary equilibrium reaction such as Equation 4 is required to affect the ratio of products, a longer residence time must be provided. Generally, when carbon tetrachloride is desired as the main product, a relatively lower maximum temperature in the reactor is required and a longer residence time to minimize formation of trichloroethylene and chloroform and, conversely, when perchloroethylene is desired as the main product, a higher maximum temperature is required and a shorter residence time is desirable to minimize the formation of heavy ends, e. g., $C_4Cl_6 + C_6Cl_6$.

Reaction condition

To secure a maximum yield of the desired end product or products with a maximum formation of heavy ends, it is necessary to maintain substantially uniform temperature conditions throughout the reaction zone. Stated differently, to hold the formation of heavy ends, e. g., hexachlorobenzene and hexachlorobutadiene, to a minimum, the maximum temperature in the reaction zone should not exceed the minimum temperature of the reaction zone by more than about 100° C. and preferably not more than 50° C. Observance of this condition is also desirable for other reasons; e. g., if the boundary walls defining the reaction space are relatively cold, the trichloroethylene content tends to increase since the trichloroethylene will not attain a temperature in the time available whereat it chlorinates readily to perchloroethylene; also, the value of the equilibrium constant of reform Reaction 4 shifts materially in the range from 490° C. to 625° C. The attainment of narrow reaction temperature conditions is accomplished by utilizing a heat insulated reaction zone, operated under such conditions of high turbulence as to be substantially homogeneous and with a reaction mixture which is, in effect, self-cooling, so that the reaction zone has a very slight temperature gradient, e. g., of the order of 100° C. and preferably only 50° C. or less. Further, it has been found that undesirable side reactions leading to the formation of trichloroethylene and chloroform take place at elevated temperatures, but below the range of 475° to 700° C. It is, therefore, highly desirable that the reactants be brought to the desired reaction temperature substantially instantaneously so that the reaction can be completed under substantially uniform temperature conditions.

We have studied the temperature traverse of a heat insulated homogeneous reaction zone in a chlorination reactor and have found that a maximum temperature exists near the point of maximum turbulence within the reactor when operating with a normal retention time. This maximum temperature we prefer to use as the reference temperature in reactor operation to control the ratio of carbon tetrachloride to perchloroethylene and to control formation of trichloroethylene and chloroform. In relation to the maximum temperature, the minimum temperature present in the reaction zone must also be controlled and must be maintained within about 10° to about 100° C. of the maximum temperature to limit formation of the light ends, e. g., trichloroethylene and chloroform. We have found the minimum temperature can be measured readily and conveniently by the temperature of the gases issuing from the reactor. One should, therefore, utilize a reactor which provides a homogeneous reaction zone in which adequate fluid circulation is maintained, the gas flow in the reactor being turbulent. For a specific example of a suitable reactor, one can refer to our application, Serial No. 508,196, filed May 13, 1955, now Patent No. 2,806,768 of September 17, 1957.

To maintain trichloroethylene and chloroform production at a minimum, it is further desirable to correlate the minimum-maximum temperature differential with the maximum temperature range. Thus, to secure products which contain the least quantity of these light ends, it is desirable to hold the minimum temperature within about 10° to 20° C. of the maximum when the maximum is in the range of about 450° to 550° C., within about 20° to 40° C. of the maximum in the range of about 550° C. to 625° C., and within about 50° to 100° of the maximum temperature in the range of 625° C. to 800° C. It is, of course, possible to operate with a greater differential between the minimum and maximum reactor temperature. If this occurs, however, the light-end content of the product will be undesirably high as compared to the product obtained when the proper differential is maintained.

The practice of the invention will become further apparent from the several examples which follow and which are set forth as illustrative of various practices embodying the invention.

*Example 1.*—As illustrative of the chlorination of propane, 0.43 pound moles per hour of propane and 4.95 pound moles per hour of chlorine were fed into a reactor as gases at 50° C., together with 1.79 pound moles of a liquid coolant at 25° C., made up in the ratio of one mole of carbon tetrachloride and one mole of perchloroethylene, the maximum temperature within the reactor being maintained at 585° C. under a pressure of 10 pounds per square inch gauge. The ratio of chlorine to propane was 11.5 to 1 on a molal basis, while the relation of liquid coolant to chlorine on a molal basis was 0.36 to 1.

The gases issued from the reaction zone at a temperature of 545° C.; they were suitably cooled and the various liquid and gas fractions separated. The hydrogen chloride was removed while the unused chlorine, amounting to 1.00 pound moles per hour, was recycled. The total net end product recovered amounted to 136.9 pounds per hour and contained 55.8% carbon tetrachloride, 44% perchloroethylene, and 0.2% hexachlorobenzene on a weight basis. Sufficient of the carbon tetrachloride and perchloroethylene were separated to provide the liquid coolant required for further reaction and the remainder was separated and recovered as product.

*Examples 2–6.*—In the same manner as Example 1, further runs were made with various reactants and coolants, with the following results:

|  | Example | | | | |
|---|---|---|---|---|---|
|  | 2 | 3 | 4 | 5 | 6 |
| Lb. mol per hr. Cl$_2$, 50° C. | 3.80 | 3.80 | 4.40 | 4.38 | 4.38 |
| Lb. mol per hr. natural gas,[1] fed at 25° C. | 0.67 | 0.67 |  |  |  |
| Lb. mol per hr. propylene dichloride fed as liquid |  |  | 0.69 |  |  |
| Lb. mol per hr. ethylene dichloride fed as liquid |  |  |  | 0.79 | 0.79 |
| Lb. mol per hr. carbon tetrachloride fed as liquid | 1.05 |  | 0.87 | 0.35 |  |
| Lb. mol per hr. perchloroethylene fed as liquid |  | 1.35 |  |  | 0.40 |
| Reactor pressure, p. s. i. g. | 4.0 | 3.5 | 4.8 | 3.8 | 3.8 |
| Reactor temperature (max.), °C. | 580 | 580 | 585 | 563 | 562 |
| Temperature exit gases, °C. | 566 | 570 | 574 | 550 | 555 |
| Liquid coolant temp., degrees | 23 | 25 | 25 | 20 | 25 |
| Liquid coolant pressure | 10 p. s. i. ga. for each example | | | | |
| Vol. percent unreacted chlorine in reactor exit gas | 18.1 | 12.8 | 3.9 | 27.7 | 27.5 |
| Lb. mol hr. unreacted chlorine in reactor exit gas | 1.02 | 0.74 | 0.26 | 1.846 | 1.71 |
| Product Composition: | | | | | |
| lbs./hr. carbon tetrachloride | 87.0 | 131.0 | 106.0 | 25.2 | 46.2 |
| lbs./hr. perchloroethylene | 16.5 | 39.8 | 113.0 | 117.0 | 105.0 |
| lbs./hr. hexachlorobenzene + hexachlorobutadiene | 1.5 | 1.6 | 1.4 | 1.2 | 1.8 |
| lbs./hr. total RCl product | 105.0 | 172.4 | 220.4 | 143.4 | 153.0 |
| Retention time, seconds | 13.7 | 12.7 | 13.2 | 13.8 | 13.7 |

[1] The natural gas had a composition of 14 mole percent ethane, 85 mole percent methane and 1% nitrogen, carbon dioxide and other inerts.

The above examples are illustrative of the utility of liquid coolant with various gaseous and liquid hydrocarbon feed materials to hold the formation of heavy ends to a minimum in a process for manufacture of carbon tetrachloride and perchloroethylene. In Examples 2, 4 and 5, carbon tetrachloride, derived from a separate process, was used as liquid coolant, while in Example 3, perchloroethylene, derived from a separate process, was used as a liquid coolant; in Examples 3, 4 and 5, reforming of the coolant is in evidence under the conditions of the run. The total chloroform-trichloroethylene present in the products in the above was between 5 and 50 parts per million.

*Examples 7, 8 and 9.*—A gas stream containing the hydrocarbon and chlorine and a vapor-liquid coolant stream having the composition set forth in the following table, were fed into the reactor as a highly mixed vapor and liquid stream. The major coolant stream was liquid at 35° C., while a minor amount of coolant entered as vapor at 180° C.; both coolants were introduced into the reactor inlet facilities in such manner that (1) a high degree of mixing of the coolant was first attained with the chlorine and (2) the hydrocarbon was then so introduced that essentially no reaction ensued until the entire mixture entered the reaction zone. Reaction then ensued and reaction of the propane or propylene with chlorine was complete. In Examples 7 and 8, the coolant served only to take up the heat reaction and maintain the desired temperature level, while in Example 9, reforming went on, as will be explained.

The reaction gives rise to a small quantity of by-products, e. g., hexachlorobenzene, hexachlorobutadiene and hexachloroethane. There were recovered and the hexachlorobutadiene and hexachloroethane were returned to the reactor; for ease in handling, they were recovered from solution in a carbon tetrachloride-tetrachloroethylene mixture, the whole being vaporized and fed into the reactor at 180° C. as a portion of the coolant along with the major liquid coolant stream.

The product from the reactor in each instance was cooled immediately as it issued from the reactor to bring any side reactions to an end. The crude mixture of products was then suitably handled to separate the by-products, which were returned as the aforementioned vapor coolant, a portion of the crude mixture of carbon tetrachloride and tetrachloroethylene was returned as the aforementioned liquid coolant, while the remainder was fractionated and recovered as product.

Further details are given in the following table:

|  | Pound Moles per Hour | | |
|---|---|---|---|
|  | Example | | |
|  | No. 7 | No. 8 | No. 9 |
| Feed to reactor: | | | |
| Propane | 1.0 |  | 1.0 |
| Propylene |  | 1.0 |  |
| Chlorine feed | 9.03 | 7.7 | 10.80 |
| Liquid coolant | 4.27 | 2.34 | 4.96 |
| Vapor coolant | 0.39 | 0.38 | 0.59 |
| Liquid coolant composition (35° C.): | | | |
| Chlorine | 0.04 | 0.02 |  |
| Hydrogen chloride | 0.02 |  |  |
| Carbon tetrachloride | 2.08 | 1.13 | 2.88 |
| Tetrachloroethylene | 2.08 | 1.13 | 1.88 |
| Hexachloroethane | 0.05 | 0.06 | 0.20 |
| Vapor coolant composition (180° C.): | | | |
| Carbon tetrachloride | 0.15 | 0.15 | 0.33 |
| Tetrachloroethylene | 0.15 | 0.15 | 0.22 |
| Hexachloroethane | 0.01 |  | 0.02 |
| Hexachlorobutadiene | 0.08 | 0.8 | 0.02 |
| Reactor—Maximum temperature, °C. | 594 | 590 | 542 |
| Temperature exit gases, °C. | 585 | 581 | 538 |
| Reactor retention time, seconds | 31½ | 43 | 27 |
| Composition out of the reactor: | | | |
| Hydrogen chloride | 8.02 | 6.00 | 8.03 |
| Chlorine | 1.33 | 1.01 | 2.61 |
| Carbon tetrachloride | 3.10 | 2.15 | 4.48 |
| Tetrachloroethylene | 3.10 | 2.15 | 2.93 |
| Hexachlorobutadiene | 0.056 | 0.12 | 0.02 |
| Hexachloroethane | 0.12 | 0.06 | 0.30 |
| Hexachlorobenzene | 0.04 | 0.04 | 0.01 |
| Net Yield, Propane, Example 7: | | | |
| Carbon tetrachloride | (3.10−2.23)=0.87 | | |
| Tetrachloroethylene | (3.10−2.23)=0.87 | | |
| Net Yield, Propylene, Example 8: | | | |
| Carbon Tetrachloride | (2.15−1.28)=0.87 | | |
| Tetrachloroethylene | (2.15−1.28)=0.87 | | |
| Net Yield, Propane, Example 9: | | | |
| Carbon tetrachloride | (4.48−3.21)=1.27 | | |
| Tetrachloroethylene | (2.93−2.10)=0.83 | | |

It will be observed in the above Examples 7 and 8 that the ratio of carbon tetrachloride to tetrachloroethylene in the feed to the reactor, on a molal basis, is essentially 1-to-1, and that the same is true of this same ratio in the products issuing from the reactor. Thus, the desired products, carbon tetrachloride, and tetrachloroethylene, are produced in accordance with the appropriate one of Reaction 1 or Reaction 2 and any over-all effect on the product distribution from Reaction 4 is absent.

The distribution of the products, carbon tetrachloride and perchloroethylene in Example 9, differs from those of Example 7 and from what would be expected from Reaction 1 because of the simultaneous occurrence of the secondary equilibrium Reaction 4, the over-all result representing a completion of the reaction of propane with chlorine and the substantial attainment of equilibrium for Reaction 4. The composition of the liquid coolant and the vapor coolant did not alter the product distribution under the conditions of this run; the ratio of carbon tetrachloride to perchloroethylene in the liquid coolant and in the vapor coolant is the same as the ratio of these in the product out of the reactor, e. g., approximately 1.5. Since the equilibrium constant of Reaction 4 is a function of the maximum temperature and the concentration of chlorine, carbon tetrachloride and perchloroethylene, we prefer principally to vary only the chlorine concentration and the maximum temperature to control the ratio of the products, carbon tetrachloride and perchloroethylene. This was accomplished in Example 9 to demonstrate that the ratio of carbon tetrachloride to perchloroethylene in the product was not controlled by the coolant composition, but is a function of the maximum temperature and chlorine concentration.

In the above examples, the concentration of trichloroethylene and chloroform was less than 10 parts per million in each instance.

This is a continuation-in-part of application Serial No. 510,566, filed May 23, 1955, now abandoned, of application Serial No. 555,317, filed December 27, 1955, now abandoned, and of application Serial No. 624,752, filed November 28, 1956, now abandoned.

We claim:

1. A process for the preparation of a perchlorinated aliphatic hydrocarbon selected from the group consisting of carbon tetrachloride, perchloroethylene and mixtures thereof comprising introducing at least three components: (1) chlorine, (2) a compound to be chlorinated, said compound having from one to three carbon atoms and being selected from the group consisting of aliphatic saturated hydrocarbons, partly chlorinated aliphatic saturated hydrocarbons, aliphatic hydrocarbons having a double bond, and mixtures thereof, and (3) a liquid coolant comprising a chlorinated aliphatic compound selected from the group consisting of carbon tetrachloride, perchloroethylene, hexachloroethane, hexachlorobutadiene, and mixtures thereof, into a homogeneous reaction zone under turbulent conditions, said zone being maintained at all points at a substantially constant maximum temperature between about 450° C. and about 800° C., and removing the products of reaction and the diluent from the reaction zone as a gas stream, the maximum temperature in the reaction zone being not more than 100° C. above the temperature of the gas stream removed from the reaction zone, the chlorine being present in excess of that required to react exothermically with the compound to be chlorinated and to provide a fully perchlorinated hydrocarbon.

2. A process for the preparation of a perchlorinated aliphatic hydrocarbon selected from the group consisting of carbon tetrachloride, perchloroethylene and mixtures thereof comprising introducing at least three components: (1) chlorine, (2) a compound to be chlorinated, said compound having from one to three carbon atoms, and being selected from the group consisting of aliphatic saturated hydrocarbons, partly chlorinated aliphatic saturated hydrocarbons, aliphatic hydrocarbons having a double bond, and mixtures thereof, and (3) a liquid coolant comprising a chlorinated aliphatic compound selected from the group consisting of carbon tetrachloride, perchloroethylene, hexachloroethane, hexachlorobutadiene, and mixtures thereof, into a homogeneous reaction zone under turbulent conditions, said zone being maintained at all points at a substantially constant maximum temperature between about 450° C. and about 800° C., and removing the products of reaction and the diluent from the reaction zone as a gas stream, the maximum temperature in the reaction zone being not more than 50° C. above the temperature of the gas stream removed from the reaction zone, the chlorine being present in excess of that required to react exothermically with the compound to be chlorinated and to provide a fully perchlorinated hydrocarbon, the quantities of the compound, chlorine and the liquid coolant discharged into the reaction zone being sufficient to maintain said reaction zone at said temperature.

3. A process as in claim 2 wherein, in addition to the liquid coolant, at least a portion of the chlorine is introduced as a liquid.

4. A process as in claim 2 wherein, in addition to the liquid coolant, at least a portion of the chlorine and of the compound to be chlorinated are each introduced as a liquid.

5. A process for the preparation of a perchlorinated aliphatic hydrocarbon selected from the group consisting of carbon tetrachloride, perchloroethylene, and mixtures thereof, the process comprising discharging chlorine, a compound having from one to three carbon atoms and being selected from the group consisting of aliphatic saturated hydrocarbons, partly chlorinated aliphatic saturated hydrocarbons, aliphatic hydrocarbons having a double bond, and mixtures thereof, into a reaction zone which is at a temperature between about 450° C. and about 800° C. and conducive to perchlorination of said compound, the chlorine being present in excess of that required to react exothermically with the compound and provide a fully perchlorinated hydrocarbon, simultaneously discharging into the reaction zone as a coolant a liquid chlorinated aliphatic compound selected from the group consisting of carbon tetrachloride, perchloroethylene and hexachloroethane and mixtures thereof, the quantity of the liquid chlorinated aliphatic compound discharged into the reaction zone being sufficient to take up the heat of reaction of the chlorine and the compound to be chlorinated to an extent sufficient to maintain the reaction zone at said temperature, recovering the products of reaction and the coolant as liquids, separating the liquid coolant, and returning the liquid coolant as aforesaid.

6. The process of chlorinating propane to produce carbon tetrachloride and perchloroethylene comprising forming a mixture of chlorine and propane, discharging said mixture into a reaction zone maintained at a temperature of about 585° C. together with a liquid diluent selected from the group consisting of carbon tetrachloride, perchloroethylene, hexachloroethane and mixtures thereof, said propane, chlorine and liquid diluent being fed in such an amount in relation to one another as to maintain the reaction zone at said temperature, and recovering carbon tetrachloride and perchloroethylene from the reaction zone.

7. A process for the preparation of a perchlorinated aliphatic hydrocarbon selected from the group consisting of carbon tetrachloride, perchloroethylene, and mixtures thereof, the process comprising forming a mixture of chlorine and a compound having from one to three carbon atoms and being selected from the group consisting of aliphatic saturated hydrocarbons, partly chlorinated aliphatic saturated hydrocarbons, aliphatic hydrocarbons having a double bond, and mixtures thereof, discharging said mixture into a reaction zone which is at a temperature between about 450° and about 800° C. and conducive to perchlorination of said compound, the chlorine being present in excess of that required to react exothermically with the compound and provide a fully perchlorinated hydrocarbon, simultaneously discharging into the mixture for release with the mixture in the reaction zone a liquid chlorinated aliphatic compound selected from the group consisting of carbon tetrachloride, perchloroethylene and hexachloroethane and mixtures thereof, the quantities of the compound, chlorine and the liquid chlorinated aliphatic compound discharged into the reaction zone being sufficient to maintain the reaction zone at said temperature, recovering the products of reaction and the diluent as liquids, separating the liquid diluent, and returning the liquid diluent as aforesaid.

References Cited in the file of this patent

UNITED STATES PATENTS

| | | |
|---|---|---|
| 2,442,323 | Davis et al. | May 25, 1948 |
| 2,442,324 | Heitz et al. | May 25, 1948 |
| 2,577,388 | Warren | Dec. 4, 1951 |
| 2,763,699 | Van Dijk et al. | Sept. 18, 1956 |